United States Patent Office 3,485,873
Patented Dec. 23, 1969

3,485,873
N-BENZYL-N-METHYL-OMEGA-PHENYL-OMEGA-CYCLOALKYL-LOWER-ALKYLAMINES
Mario D. Aceto, Schodack, N.Y., Louis S. Harris, Chapel Hill, N.C., and Alonzo M. Lands, New Baltimore, and Ernest John Alexander, East Greenbush, N.Y., assignors to Sterling Drug Inc., New York, N.Y., a corporation of Delaware
No Drawing. Continuation-in-part of application Ser. No. 465,767, June 21, 1965. This application Dec. 21, 1966, Ser. No. 603,430
Int. Cl. C07c 87/28; A61k 27/00
U.S. Cl. 260—570.5                     3 Claims

ABSTRACT OF THE DISCLOSURE

ω - phenyl - ω - cycloalkyl - lower - alkylamines are useful for counteracting depressive states in animal organisms. The compounds are prepared by alkylating the appropriately substituted acetonitrile with an amino-lower-alkyl halide, and, if desired, heating the resulting substituted nitrile with a strong base to replace the nitrile group by hydrogen.

---

This application is a continuation-in-part of our copending application, Ser. No. 465,767, filed June 21, 1965, now U.S. Patent 3,328,249.

This invention relates to a process for counteracting depressive states in animal organisms, to compositions for use in said process, and to intermediates in the preparation of the active ingredients thereof.

In particular the invention resides in a process for counteracting depressive states in animal organisms which comprises administering a pharmacologically effective amount of a compound of the formula

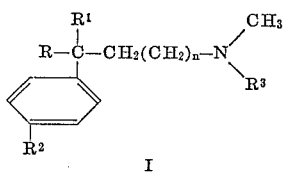

I wherein R is cyclohexyl or cyclopentyl, $R^1$ is hydrogen or cyano, $R^2$ is hydrogen or methoxy, $R^3$ is hydrogen, methyl or benzyl, and $n$ is 1 or 2; or a pharmaceutically acceptable acid-addition salt thereof. The invention also resides in compositions containing said compounds in unit dosage form.

Some of the compounds within the scope of the above general Formula I are known compounds. For example, N,N - dimethyl - 3 - cyclohexyl - 3 - phenylpropylamine and N,N - dimethyl - 3 - cyclopentyl - 3 - phenylpropylamine are disclosed in Ruddy and Becker U.S. Patent 2,662,886. The compounds are there stated to be useful as antispasmodic agents. Although certain pharmacological tests have indicated the presence of some antispasmodic and antihistaminic activity, it has surprisingly been found that the primary pharmacological property of compounds of Formula I is antidepressant activity, indicating the usefulness of the compounds for trial to combat depressant states. This property was demonstrated in animal studies by the fact that the compounds have been found to prevent the onset of reserpine-induced blepharoptosis and to reverse established ptosis at dose levels ranging from 0.5 to 50 mg./kg. An especially preferred and highly active group of compounds are those having the formula

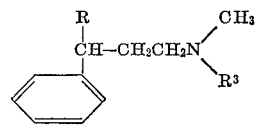

wherein R is cyclohexyl or cyclopentyl and $R^3$ is hydrogen or methyl. These compounds have been found to be at least as potent as imipramine [5 - (2 - dimethylaminopropyl) - 10,11 - dihydro - 5H - dibenz[b,f]azepine hydrochloride], in preventing the onset of reserpine-induced blepharoptosis in mice, and also capable of reversing established ptosis at doses as small as 0.5 mg./kg.

The antidepressant activity of the compounds of Formula I above appears to be a property specific to the structures covered thereby, as slight variations in structure, for example, where the amino moiety is diethylamino or piperidino or where cycloalkyl is replaced by phenyl, bring about complete or nearly complete loss of antidepressant activity, or such activity is accompanied by increased anticholinergic or antihistaminic activity.

The compounds of Formula I where $R^1$ is cyano and $R^3$ is methyl or benzyl can be prepared by reacting the appropriate substituted acetonitrile of the formula

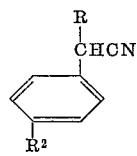
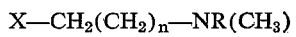

with an aminoalkyl halide of the formula $$X-CH_2(CH_2)_n-NR(CH_3)$$

where X is chlorine or bromine in the presence of a strong base, such as an alkali metal lower-alkoxide or alkali metal amide, for example, sodamide. The reaction takes place in an inert organic solvent under anhydrous conditions at a temperature between about 50 and 100° C. With prolonged heating at higher temperatures in the presence of the strong base, the cyano group is lost, affording compounds of Formula I where $R^1$ is hydrogen. The compounds of Formula I where $R^3$ is hydrogen are prepared by hydrogenolysis of the compounds where $R^3$ is benzyl.

The compounds of formula I can be used either in the free base form or in the form of pharmaceutically acceptable acid-addition salts. Pharmaceutically acceptable acid-addition salts are those having anions which are relatively innocuous to the animal organism at the therapeutic dose levels used, so that the beneficial physiological properties inherent in the free base are not vitiated by side effects ascribable to the anions. Appropriate acid-addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid and the like, giving the hydrochloride, hydrobromide, hydriodide, nitrate, phosphate or acid phosphate, sulfate or bisulfate, acetate, citrate or acid citrate, tartrate or bitartrate, and lactate salts, respectively.

The compounds of Formula I can be administered either parenterally by injection in the form of an aqueous solution of an acid-addition salt form of the compounds; orally in the form of capsules, tablets, or granules; or rectally in the form of suppositories. Oral administration is a preferred method of application. The compounds and their acid-addition salts are thus prepared in unit dosage forms together with a pharmaceutical carrier by well-known pharmaceutical formulation procedures, each unit dosage form containing from 1 to 100 mg. of the active ingredient.

As used herein, the term "pharmaceutical carrier" denotes a solid or liquid devoid of significant pharmacological activity. Some examples of the substances which can serve as pharmaceutical carriers are sugars such as lactose and sucrose; starches such as corn starch and potato starch; cellulose and its derivatives, such as sodium carboxymethyl cellulose, ethyl cellulose, cellulose acetate phthalate; gelatin; talc; stearic acid; magnesium stearate, calcium sulfate; vegetable oils, such as peanut oil, cottonseed oil, sesame oil, olive oil, corn oil and oil of theobroma; propylene glycol; glycerin; sorbitol; manitol; polyethylene glycol; agar; alginic acid; water; isotonic saline; and phosphate buffer solutions, as well as other nontoxic compatible substances used in pharmaceutical formulations. Wetting agents and lubricants such as sodium lauryl sulfate, as well as coloring agents, flavoring agents and preservatives, can also be present.

A further aspect of the invention resides in novel intermediates of the formula

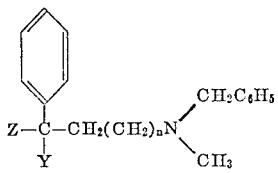

wherein Y is cyclohexyl or 1-cyclohexenyl, Z is hydrogen or cyano, and $n$ is 1 or 2. Although the compounds wherein Y is cyclohexyl are within the scope of Formula I and have anti-depressant activity, they are also useful as intermediates in preparing other compounds within the scope of Formula I as shown in the examples below. These intermediates can be used either in the free base form or in the form of the fully equivalent acid-addition salts. When used as intermediates, any acid-addition salt can be employed.

The following examples will further illustrate the invention, without the latter being limited thereby.

EXAMPLE 1

2-cyclohexyl-4-(N-benzyl - N - methylamino)-2-phenylbutyronitrile [I; R is cyclohexyl, $R^1$ is CN, $R^2$ is H, $R^3$ is benzyl, $n=1$]

Phenylcyclohexylacetonitrile (24.5 g.) in 75 ml. of benzene was added to a stirred suspension of 6.5 g. of sodium amide in 50 ml. of benzene and the mixture was heated and stirred at 60° C. for two and one-half hours. The mixture was cooled to 25° C. and a solution of 19.8 g. of N-benzyl-N-methyl-2-chloroethylamine in 75 ml. of benzene was introduced by rapid dropwise addition. The reaction mixture was heated at 65° C. for five hours, and then after allowing it to stand at room temperature overnight, water was added and the benzene layer was separated and washed with saturated sodium chloride solution. The benzene layer was dried, decolorized with activated charcoal, filtered and concentrated to remove the solvent. The residue was distilled at 185–212° C. (0.05 mm.) and the distillate treated with dilute hydrochloric acid to give 2-cyclohexyl-4-(N-benzyl-N-methylamino)-2-phenylbutyronitrile in the form of the hydrochloride salt, M.P. 216.0–219.0° C. (corr.).

By replacing the N-benzyl-N-methyl-2-chloroethylamine in the foregoing preparation by a molar equivalent amount of 2-dimethylaminoethyl chloride, there can be obtained 2-cyclohexyl-4-dimethylamino-2-phenylbutyronitrile [I; R is cyclohexyl, $R^1$ is CN, $R^2$ is H, $R^3$ is $CH_3$, $n=1$], which was found to be active at a dose level of 10 mg./kg. in reversing reserpine-induced ptosis in mice.

By replacing the phenylcyclohexylacetonitrile in the foregoing preparation by a molar equivalent amount of phenylcyclopentylacetonitrile, there can be obtained 2-cyclopentyl-4-(N-benzyl-N-methylamino)-2-phenylbutyronitrile [I; R is cyclopentyl, $R^1$ is CN, $R^2$ is H, $R^3$ is benzyl $n=1$].

EXAMPLE 2

N-benzyl-N-methyl-3-cyclohexyl-3-phenylpropylamine [I; R is cyclohexyl, $R^1$ is H, $R^2$ is H, $R^3$ is benzyl, $n=1$]

A solution of 15.6 g. of 2-cyclohexyl-4-(N-benzyl-N-methylamino)-2-phenylbutyronitrile in 50 ml. of xylene was added to a boiling suspension of 9 g. of sodium amide in 50 ml. of xylene, and the mixture was refluxed for thirteen hours. The mixture was allowed to stand at room temperature for three days and then hydrolyzed with an equal volume of water. The xylene layer was separated, washed with saturated sodium chloride solution, dried, decolorized and concentrated to remove the solvent. The residue was distilled at 0.05–0.1 mm. and then redistilled to give N-benzyl-N-methyl-3-cyclohexyl-3-phenylpropylamine, B.P. 168–184° C. (0.05 mm.) $n_D{}^{25}=1.5458$. A sample was converted to the hydrochloride salt with ethereal hydrogen chloride and recrystallized from ethyl acetate-ether mixture. The hydrochloride salt had the M.P. 133.0–135.0° C. (corr.).

N - benzyl-N-methyl-3-cyclohexyl-3-phenylpropylamine was active in reversal of reserpine-induced ptosis in mice at a dose level of 50 mg./kg.

By replacing the 2-cyclohexyl-4-(N-benzyl-N-methylamino)-2-phenylbutyronitrile in the foregoing preparation by 2-cyclopentyl-4-(N-benzyl - N - methylamino)-2-phenylbutyronitrile, there can be obtained N-benzyl-N-methyl-3-cyclopentyl-3-phenylpropylamine [I; R is cyclopentyl, $R^1$ is H, $R^2$ is H, $R^3$ is benzyl, $n=1$].

EXAMPLE 3

(a) N-benzyl-N-methyl-3-(1-cyclohexenyl)-3-phenylpropylamine

Cyclohexylidenephenylacetonitrile (26.2 g.) was added to a suspension of 26.2 g. of sodium amide in 200 ml. of xylene at 65° C. The mixture was heated for one hour at 65° C. and then 29.3 g. of N-benzyl-N-methyl-2-chloroethylamine hydrochloride was added portion-wise. The reaction mixture was heated at 80–85° C. for five hours and then refluxed for thirteen hours in order to remove the cyano group from the intermediate 2-(1-cyclo-hexenyl) - 2-phenyl-4-(N-benzyl-N-methylamino)butyronitrile. The mixture was allowed to stand at room temperature for three days, 200 ml. of water was added dropwise, and the xylene layer was separated, washed with sodium chloride solution, dried, decolorized, filtered, and concentrated to remove the solvent. The residue was distilled, collecting the fraction boiling at 123–180° C. (0.02–0.05 mm.), and redistilled to give N-benzyl-N-methyl-3-(1-cyclohexenyl)-3-phenylpropylamine, B.P. 182–185° C. (0.01 mm.), $n_D{}^{25}=1.5586$.

(b) N-methyl-3-cyclohexyl-3-phenylpropylamine [I; R is cyclohexyl, $R^1$, $R^2$ and $R^3$ are H, $n=1$]

N - benzyl-N-methyl - 3-(1-cyclohexenyl)-3-phenylpropylamine (10 g.) in 150 ml. of absolute ethanol was hydrogenated with 1.0 g. of palladium catalyst for two hours at 50–60° C. and about 750 lbs. pressure. The mixture was filtered, the filtrate concentrated to remove the solvent and the residue converted to the hydrochloride salt with ethereal hydrogen chloride. There was thus obtained N-methyl-3-cyclohexyl-3-phenylpropylamine in the form of its hydrochloride salt, M.P. 161.0–165.6° C.

N-methyl-3-cyclohexyl-3-phenylpropylamine can also be prepared by similar hydrogenation of N-benzyl-N- methyl-3-cyclohexyl-3-phenylpropylamine (Example 2); and hydrogenation of N-benzyl-N-methyl-3-cyclopentyl-3-phenylpropylamine affords N-methyl-3-cyclopentyl-3-phenylpropylamine [I; R is cyclopentyl, $R^1$, $R^2$ and $R^3$ are H, $n=1$].

N-methyl-3-cyclohexyl-3-phenylpropylamine was found to be active at 10 mg./kg. in both prevention and reversal of reserpine-induced ptosis in mice.

EXAMPLE 4

2 - cyclohexyl - 4-dimethylamino-2-(p-methoxyphenyl) butyronitrile [I; R is cyclohexyl, $R^1$ is CN, $R^2$ is $CH_3O$, $R^3$ is $CH_3$, $n=1$] was prepared from 30 g. of p-methoxyphenylcyclohexylacetonitrile, 18.8 g. of 2-dimethylaminoethyl chloride hydrochloride and 29 g. of sodium amide in 400 ml. of xylene according to the manipulative procedure described above in Example 3. In this instance the cyano group was not completely removed. The product was distilled and collected in two fractions, the first B.P. 145–176° C. (0.1 mm.), $n_D{}^{25}$=1.5210–31, and the second B.P. 176–185° C. (0.1 mm.), $n_D{}^{25}$=1.5264. The first fraction was treated with ethereal hydrogen chloride, and the resulting salt recrystallized first from methanolethyl acetate and then from tetrahydrofuran to give 2-cyclohexyl - 4-dimethylamine-2-(p-methoxyphenyl)butyronitrile in the form of its hydrochloride salt, M.P. 197.4–200.4° C.

2 cyclohexyl - 4-dimethylamino-2-(p-methoxyphenyl)-butyronitrile was active at 50 mg./kg. in both prevention and reversal of reserpine-induced ptosis in mice.

EXAMPLE 5

3 - cyclohexyl-3-(p-methoxyphenyl)-N,N-dimethylpropylamine [I; R is cyclohexyl, $R^1$ is H, $R^2$ is $CH_3O$, $R^3$ is $CH_3$, $n=1$]

A mixture of 13.5 g. of the second fraction from Example 4, 6.8 g. of sodium amide and 100 ml. of xylene was refluxed for thirteen hours. The product was isolated in the usual manner and distilled to give 3-cyclohexyl-3-(p-methoxyphenyl)-N,N-dimethylpropylamine, B.P. 115–134° C. (0.05 mm.), $n_D{}^{25}$=1.5196–8. A sample was converted to the hydrochloride salt which was recrystallized from ethyl acetate-methanol and had the M.P. 186.4–189.0° C. (corr.).

3 - cyclohexyl-3-(p-methoxyphenyl)-N,N-dimethylpropylamine was active at 10 mg./kg. in both prevention and reversal of reserpine-induced ptosis in mice.

EXAMPLE 6

2-cyclohexyl-5-dimethylamino-2-phenylvaleronitrile [I; R is cyclohexyl, $R^1$ is CN, $R^2$ is H, $R^3$ is $CH_3$, $n=2$] was prepared from 25 g. of cyclohexylphenylacetonitrile, 19.8 g. of 3-dimethylaminopropyl chloride hydrochloride, 28 g. of sodium amide and 300 ml. of xylene according to the manipulative procedure described above in Example 1. The product was distilled to give 2-cyclohexyl-5-dimethylamino-2-phenylvaleronitrile, M.P. 131–135° C. (0.05 mm.), $n_D{}^{25}$=1.5163–85. A sample was converted to its hydrochloride salt, M.P. 192–197° C.

By replacing the 3-dimethylaminopropyl chloride hydrochloride in the foregoing preparation by a molar equivalent amount of 3-(N-benzyl-N-methylamino)propyl chloride hydrochloride, there can be obtained 2-cyclohexyl - 5 - (N-benzyl-N-methylamino)-2-phenylvaleronitrile [I; R is cyclohexyl, $R^1$ is CN, $R^2$ is H, $R^3$ is benzyl, $n=2$].

EXAMPLE 7

4-cyclohexyl-4-phenyl-N,N-dimethylbutylamino [I; R is cyclohexyl, $R^1$ and $R^2$ are H, $R^3$ in $CH_3$, n=2]

A mixture of 23.5 g. of 2-cyclohexyl-5-dimethylamino-2-phenylvaleronitrile, 12.5 g. of sodium amide and 200 ml. of xylene was refluxed for thirteen hours. The product was isolated and distilled to give 4-cyclohexyl-4-phenyl-N,N-dimethylbutylamine, B.P. 98–110° C. (0.05 mm.), which was converted to its hydrochloride salt, M.P. 158.0–160.8° C. (corr.) when recrystallized first from tetrahydrofuran and then from ethyl acetate.

4 - cyclohexyl-4-phenyl - N,N-dimethylbutylamine was active at 50 mg./kg. in both prevention and reversal of reserpine-induced ptosis in mice.

By replacing the 2 - cyclohexyl-5-dimethylamino-2-phenylvaleronitrile in the foregoing preparation by a molar equipment amount of 2-cyclohexyl-5-(N-benzyl-N-methylamino)-2-phenylvaleronitrile, there can be obtained 4 - cyclohexyl-4-phenyl-N-benzyl-N-methylbutylamine [I; R is cyclohexyl, $R^1$ and $R^2$ are H, $R^3$ is benzyl, $n=2$]. The latter can be hydrogenated by the procedure of Example 3(b) to give 4-cyclohexyl-4-phenyl-N-methylbutylamine [I; R is cyclohexyl, $R^1$, $R^2$ and $R^3$ are H, $n=2$].

N,N-dimethyl - 3 - cyclohexyl - 3 - phenylpropylamine [I; R is cyclohexyl, $R^1$ and $R^2$ are H, $R^3$ is $CH_3$, $n=1$] significantly reversed reserpine induced ptosis at 0.5 mg./kg. and prevented its occurrence at 30 mg./kg. when injected intraperitoneally into male mice in the form of an aqueous solution of the hydrochloride salt. Depressant effects produced by injection of reserpine in cats were offset by oral administration of N,N-dimethyl-3-cyclohexyl - 3 - phenylpropylamine at doses of 8–16 mg./kg. Similar reserpine antagonism was also observed upon oral administration of N,N-dimethyl-3-cyclohexyl-3-phenylpropylamine to monkeys at 4–32 mg./kg.

Toxic effects upon administration of N,N-dimethyl-3-cyclohexyl-3-phenylpropylamine were observed only at doses far higher than the doses effective to counteract depression. The acute oral toxicity, $LD_{50}$ (mg./kg.± standard error), in the mouse was 500±16, and in the rat 880±215 (24 hours) and 820±187 (7 days). In acute oral tolerance studies in normal rabbits there were no changes in appearance or behavior at oral doses as high as 100.0 mg./kg. In acute oral tolerance studies in normal monkeys, there were no changes in appearance or behavior at oral doses of 100.0 mg./kg. except for salivation in one animal out of three. Chronic toxicity studies were carried out in albino rats and beagle dogs, and general observations, hematological studies and pathology studies indicated that no untoward effects occurred at dose levels effective to counteract depressive states.

N,N - dimethyl - 3 - cyclopentyl - 3 - phenylpropylamine [I; R is cyclopentyl, $R^1$ and $R^2$ are H, $R^3$ is $CH_3$, $n=1$] was similarly found to be effective at a dose level of 1 mg./kg. in prevention of reserpine-induced ptosis and at 0.5 mg./kg. in reversing reserpine-induced ptosis when injected intraperitoneally in mice.

Following are examples of formulation embodiments of the invention, which examples should be considered only as illustrative and not limiting:

FORMULATION 1

Capsules containing 25 mg. of N,N-dimethyl-3-cyclohexyl-3-phenylpropylamine hydrochloride Ingredients: Mg./capsule
  N,N-dimethyl - 3 - cyclohexyl - 3 - phenyl-
    propylamine hydrochloride _____ 25.00
  Calcium sulfate _____ 133.25
  Avicel (crystalline cellulose Am. Viscose
    Corp.) _____ 133.25
  Starch _____ 55.60
  Sodium lauryl sulfate _____ 2.90

Total wt. _____ 350.00

Stability studies on this formulation kept one month at 50° C. showed a loss of less than 2% of the active ingredient.

FORMULATION 2

Capsules containing 2.5 mg. of N,N-dimethyl-3-cyclohexyl-3-phenylpropylamine hydrochloride

| Ingredient: | Mg./capsule |
| --- | --- |
| N,N - dimethyl - 3 - cyclohexyl - 3 - phenylpropylamine hydrochloride | 2.5 |
| Calcium sulfate | 138.9 |
| Avicel | 150.1 |
| Starch | 55.6 |
| Sodium lauryl sulfate | 2.9 |
| Total wt. | 350.0 |

FORMULATION 3

Capsules containing 10 mg. of N,N-dimethyl-3-cyclohexyl-3-phenylpropylamine hydrochloride

| Ingredient: | Mg./capsule |
| --- | --- |
| N,N - dimethyl - 3 - cyclohexyl - 3 - phenylpropylamine hydrochloride | 10.0 |
| Calcium sulfate | 131.4 |
| Avicel | 150.1 |
| Starch | 55.6 |
| Sodium lauryl sulfate | 2.9 |
| Total wt. | 350.0 |

FORMULATION 4

Capsules containing 57.4 mg. of N,N - dimethyl - 3-cyclohexyl - 3 - phenylpropylamine hydrochloride (50 mg. calculated as free base)

| Ingredient: | Mg./capsule |
| --- | --- |
| N, N - dimethyl - 3 - cyclohexyl - 3-phenylpropylamine hydrochloride | 57.426 |
| Calcium sulfate | 89.074 |
| Avicel | 150.000 |
| Starch | 50.000 |
| Sodium lauryl sulfate | 3.500 |
| Magnesium stearate | 8.750 |
| Total wt. | 358.750 |

FORMULATION 5

Tablet formulation

| Ingredient: | Amount, g. |
| --- | --- |
| N,N - dimethyl - 3 - cyclohexyl - 3 - phenyl propylamine hydrochloride | 12.5 |
| Lactose | 80.0 |
| Starch | 5.0 |
| Magnesium stearate | 2.0 |

The ingredients are mixed, granulated and pressed into tablets. The above formulation makes 1000 tablets containing 12.5 mg. of active ingredient or 500 tablets containing 25 mg. of active ingredient.

N,N - dimethyl - 3 - cyclohexyl - 3 - phenylpropylamine hydrochloride can be dissolved in distilled water at a concentration of 25 mg./cc. and stored in sterile ampules for administration by intramuscular injection.

We claim:

1. A compound of the formula

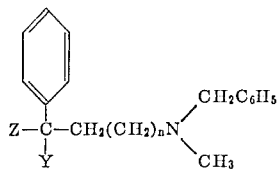

wherein Y is cyclohexyl or 1-cyclohexenyl, Z is hydrogen and $n$ is 1 or 2.

2. N - benzyl - N - methyl - 3 - cyclohexyl - 3-phenylpropylamine, according to claim 1.

3. N - benzyl - N - methyl - 3 - (1 - cyclohexenyl)-3-phenylpropylamine, according to claim 1.

References Cited

UNITED STATES PATENTS

| | | | |
| --- | --- | --- | --- |
| 3,282,937 | 11/1966 | Klavehn et al. | |
| 3,409,671 | 11/1968 | Ehrhart et al. | |
| 2,446,804 | 8/1948 | Bergel et al. | |
| 2,542,466 | 2/1951 | Blicke | 260—465 X |
| 2,566,535 | 9/1951 | Ruddy | 260—465 X |
| 3,261,859 | 7/1966 | Dengel | 260—465 |

CHARLES B. PARKER, Primary Examiner

S. T. LAWRENCE, Assistant Examiner

U.S. Cl. X.R.

260—465, 501.1, 501.17, 570.9; 424—304, 330